Figure 1:
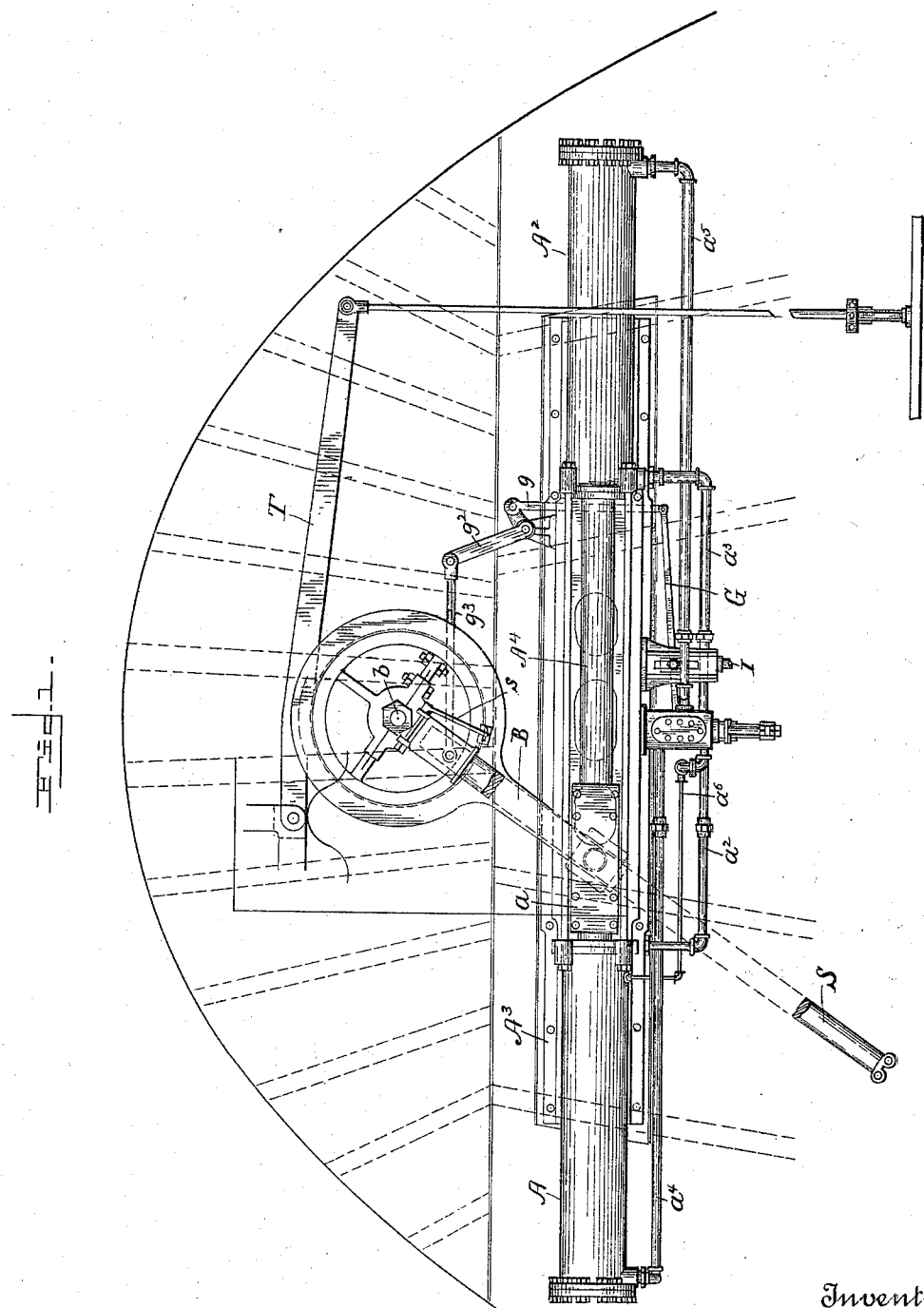

(No Model.)  6 Sheets—Sheet 1.

H. A. SPILLER.
STEERING GEAR FOR VESSELS.

No. 582,104. Patented May 4, 1897.

Witnesses:
H. S. Belt.
R. M. Elliott

Inventor:
Harry A. Spiller,
by R. S. Dyrenforth,
his attorney (No Model.) 6 Sheets—Sheet 2.

H. A. SPILLER.
STEERING GEAR FOR VESSELS.

No. 582,104. Patented May 4, 1897.

Witnesses:
F. S. Belt.
Belle Elliott.

Inventor:
Harry A. Spiller,
R. S. Dyrenforth,
his attorney.

(No Model.)  6 Sheets—Sheet 3.
H. A. SPILLER.
STEERING GEAR FOR VESSELS.
No. 582,104.  Patented May 4, 1897.
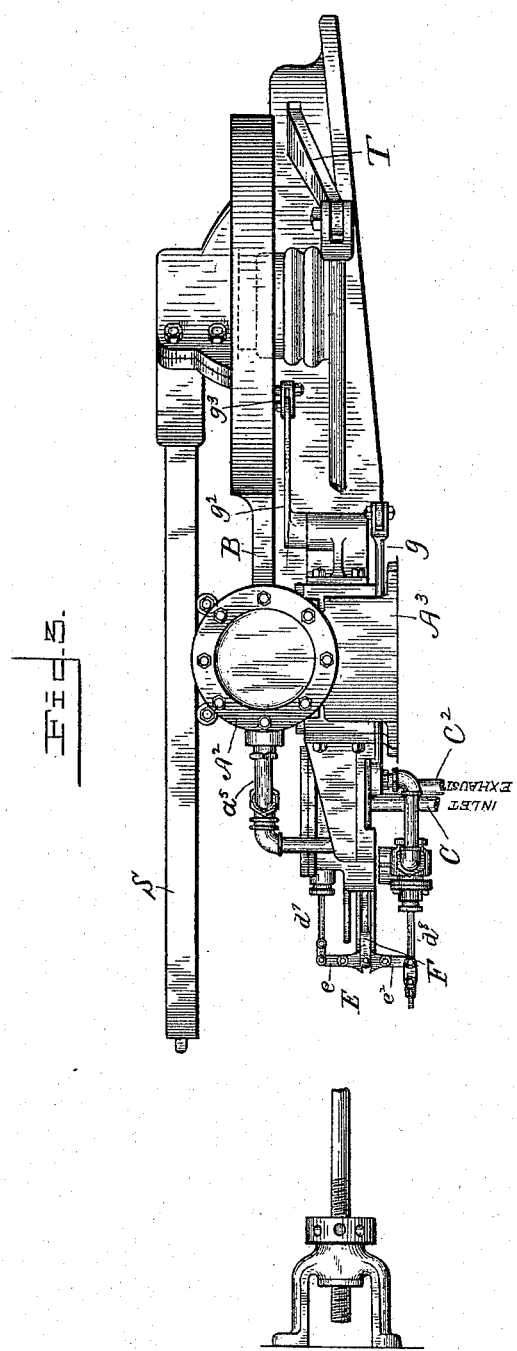
Witnesses:
F. S. Belt.
R. Elle Elliott
Inventor:
Harry A. Spiller,
by R. S. Dyrenforth,
his attorney.

(No Model.)  6 Sheets—Sheet 4.
H. A. SPILLER.
STEERING GEAR FOR VESSELS.
No. 582,104. Patented May 4, 1897.
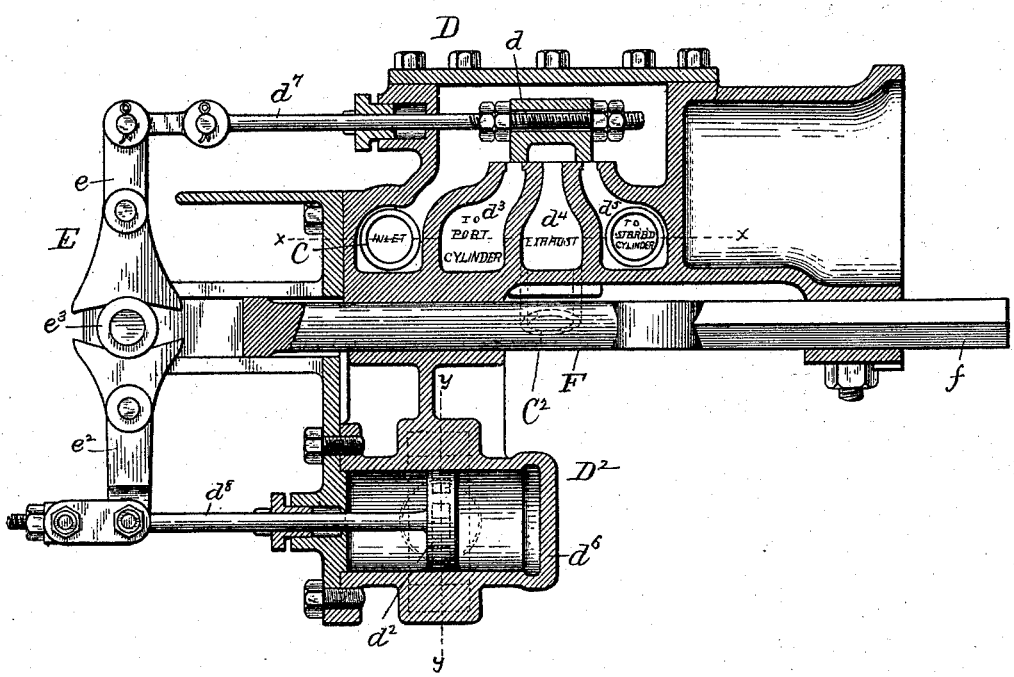
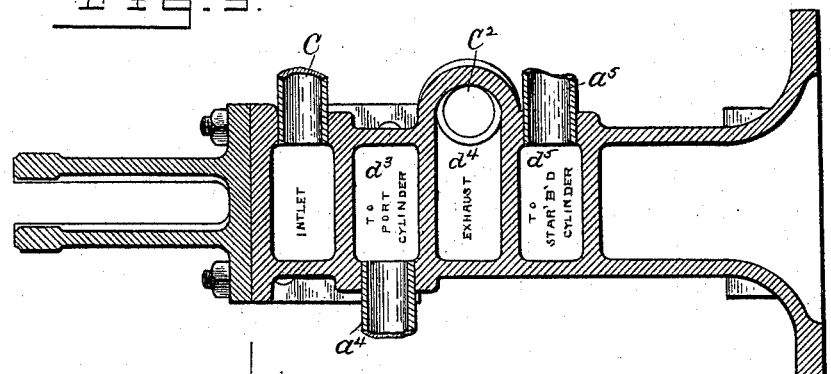
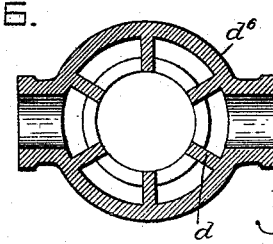
Witnesses:
Inventor:
Harry A. Spiller,
by his attorney (No Model.) 6 Sheets—Sheet 5.
H. A. SPILLER.
STEERING GEAR FOR VESSELS.
No. 582,104. Patented May 4, 1897.
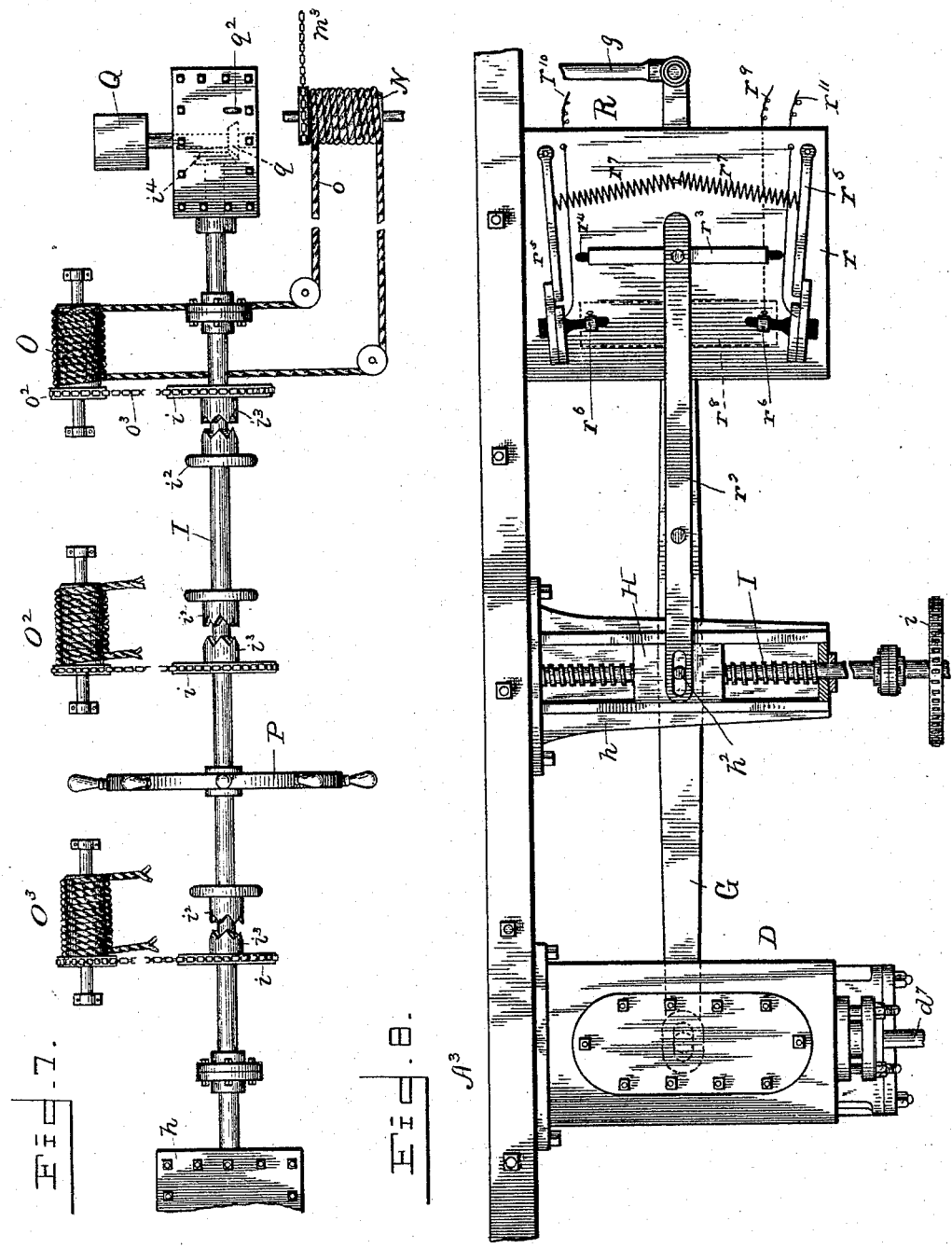
Witnesses:
F. S. Belt.
R. Elliott.
Inventor:
Harry A. Spiller,
by R. S. Dyrenforth.
his attorney
THE NORRIS PETERS CO., PHOTO-LITHO., WASHINGTON, D. C.

(No Model.) 6 Sheets—Sheet 6.
H. A. SPILLER.
STEERING GEAR FOR VESSELS.
No. 582,104. Patented May 4, 1897.
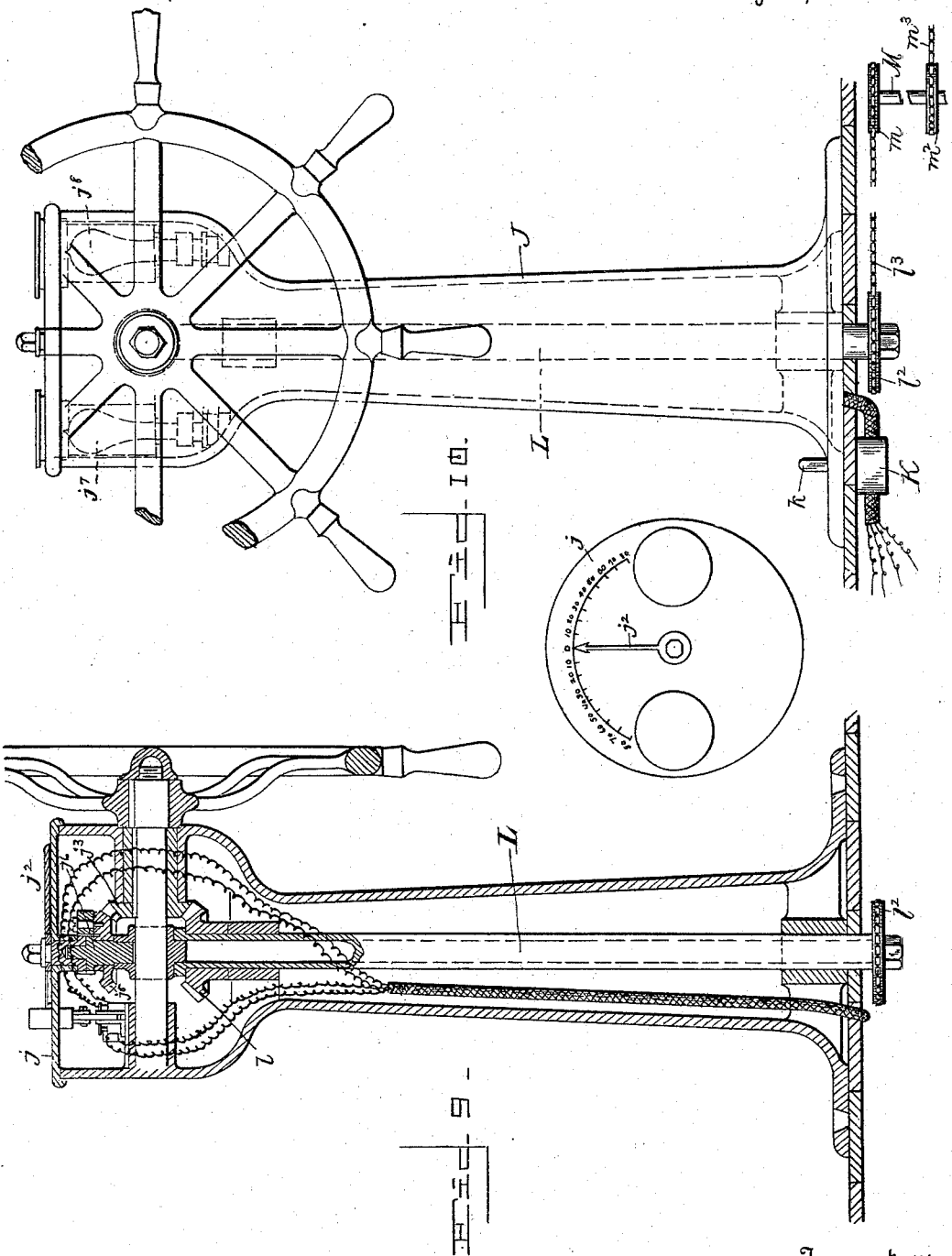
Witnesses:
F. S. Belt.
Rell Feist
Inventor:
Harry A. Spiller,
by R. S. Dyrenforth,
his attorney.

United States Patent Office.

HARRY A. SPILLER, OF BOSTON, MASSACHUSETTS, ASSIGNOR TO THE PNEUMATIC GUN CARRIAGE AND POWER COMPANY, OF WHEELING, WEST VIRGINIA, AND WASHINGTON, DISTRICT OF COLUMBIA.

STEERING-GEAR FOR VESSELS.

SPECIFICATION forming part of Letters Patent No. 582,104, dated May 4, 1897.

Application filed June 10, 1896. Serial No. 594,948. (No model.)

*To all whom it may concern:*

Be it known that I, HARRY A. SPILLER, a citizen of the United States, residing at Boston, in the county of Suffolk and State of Massachusetts, have invented certain new and useful Improvements in Electropneumatic Steering-Gear; and I do hereby declare the following to be a full, clear, and exact description of the invention, such as will enable others skilled in the art to which it appertains to make and use the same.

This invention relates to steering-gear for vessels.

The object is to effect the steering of a vessel in a certain manner either by a helmsman at the usual place or by a person stationed at any other part of the vessel; furthermore, to provide an apparatus in which, after the requisite movement of the rudder has been effected, it may be instantly checked against further movement at the time and held yieldingly in the position to which it has been moved; furthermore, to provide means for preventing the pistons from striking the cylinder-heads or the rudder from going too far independent of the pilot's or steersman's care in moving the rudder "hard over;" furthermore, to provide an apparatus in which the valves controlling the exhaust and supply of aeriform fluid to the cylinders may be operated directly from the steering-wheel without the employment of the ropes, chains, and quadrants usually employed in this connection; furthermore, to provide an apparatus in which the power will be applied directly to the rudder, thereby lessening the number of parts constituting the apparatus and as a result reducing the danger of accident or breakage to a minimum and also causing the rudder to derive the direct benefit of the cushion formed by the fluid confined on both sides of the piston; furthermore, to provide an apparatus in which the requisite movement of the rudder will be effected through the agency of compressed aeriform fluid, and, finally, to provide an apparatus in which the cushioning of the piston will be effected automatically and simultaneously with the movement of the rudder.

With these objects in view the invention consists in the novel construction and combination of parts of a steering-gear for vessels, as will be hereinafter fully described and claimed.

In a steering-gear characterized by my invention I employ two independent cylinders, arranged in this instance in horizontal alinement and supported and held in proper operative position to each other on a suitable bed or sole-plate secured transversely of the stern of the vessel.

Working within each cylinder is a piston (not shown) connected to a common piston-rod, to which is secured a cross-head adapted to impart motion to a tiller which rotates the rudder-head. The pistons are moved by compressed air, which is admitted by pipes leading from a suitable source of supply, and when the apparatus is at rest the outer ends of the cylinders are under pressure, thereby holding the piston-rod, and with it the rudder, fixed, movement resulting when air is partially exhausted from one cylinder and supply maintained in the other.

In order to hold the rudder steady against the varying strains of heavy waves, the inner ends of the cylinders are filled with a fluid, preferably compressed air, the flow of which from the inner end of one cylinder to the inner end of the other takes place simultaneously with the change of supply of air from the outer end of one cylinder to the outer end of the other. Otherwise there could be no movement of the piston. In order to effect this simultaneous action of the air, I provide two valve-chests, wherein are two valves, separated from and operating independently of each other, one, the operating air-valve, controlling the exhaust and supply of air to the outer ends of the cylinders, and the other one, the locking cushion-valve, controlling the passage of air from the inner end of one cylinder to the inner end of the other cylinder. These two valves are moved in unison through the medium of a two-part rock-lever, to one member of which is coupled the stem of the operating air-valve and to the other member the stem of the locking cushion-valve. This two-part lever may be operated by any suitable or preferred mechanism, but from a standpoint of simplicity, effectiveness in operation, and positive and direct action attained I prefer to mount the roller constituting the fulcrum of the lever on a horizontally-disposed slide-rod, arranged by preference between the two valve-chests and connected by a follow-up system with the tiller, whereby the amount of movement of the helm is made to correspond with the amount of movement given the wheel by the helmsman, thereby to cause the motion of the rudder to be stopped at the proper instant.

The member of the follow-up system to which the slide-rod is coupled is connected with a screw-threaded block working in a suitable casing adjacent to the valve-chests, the block being reciprocated by means of a screw-shaft actuated either from a steering wheel or wheels or by a motor, as may be desired or necessary. When the block is moved by the rotation of the screw-shaft, motion is imparted to the follow-up rod connected with the slide-rod, thereby moving this latter rod in or out, as the case may be, thus shifting the operating air-valve to allow ingress or supply of air to one cylinder and the egress or exhaust of air from the other cylinder and also moving the locking cushion-valve to allow the air at the inner end of one cylinder to escape to the inner end of the other cylinder. As the tiller moves it imparts motion to the follow-up system, and the latter closes the valves unless the helmsman meets the movement with many turns of the wheel, as in the case of putting the helm hard over. The amount of movement of the rudder will always agree with the amount of movement given the wheel, and this movement may be accurately determined by a dial at the steering-wheel post in the wheel-house, over which travels a pointer that indicates the exact degree of travel of the rudder. Wheel-posts may also be located at the turrets, on the bridge, and at other points on the vessel, and from any one of these points the steering may be effected by wire ropes operated by the wheel to turn a drum connected by interposed mechanism with the screw-shaft.

To prevent interference between the different steering-wheels, each is connected independently of the other with the screw-shaft and is thrown into and out of operative relation therewith by means of suitable clutches mounted on the screw-shaft and operated by a helmsman or seaman in the stern of the vessel. Thus the clutch controlling the operation of the drum operated from the main steering-wheel will normally be locked and the other clutches unlocked, but should an accident happen to this wheel it will be thrown out of use by unlocking its clutch and locking one of the others.

In addition to the mechanical appliances for operating the valves, a motor, operated either by compressed air or by electricity, preferably the latter, may be employed. This motor will normally be out of operative engagement with the screw-shaft, but may at will be locked into engagement therewith. A suitable switch and reversing-coils are to be used in connection with the motor, whereby when the rudder is hard over and the motor is stopped the current may be reversed to restart the motor and move the rudder in the opposite direction.

Further and more specific details of construction will be hereinafter fully described and claimed.

In the accompanying drawings, forming a part of this specification and in which like letters of reference indicate corresponding parts, I have illustrated one form of embodiment of my invention, although it is to be understood that other forms of embodiment thereof may be employed without departing from the spirit of the same, and in these drawings—

Figure 2:
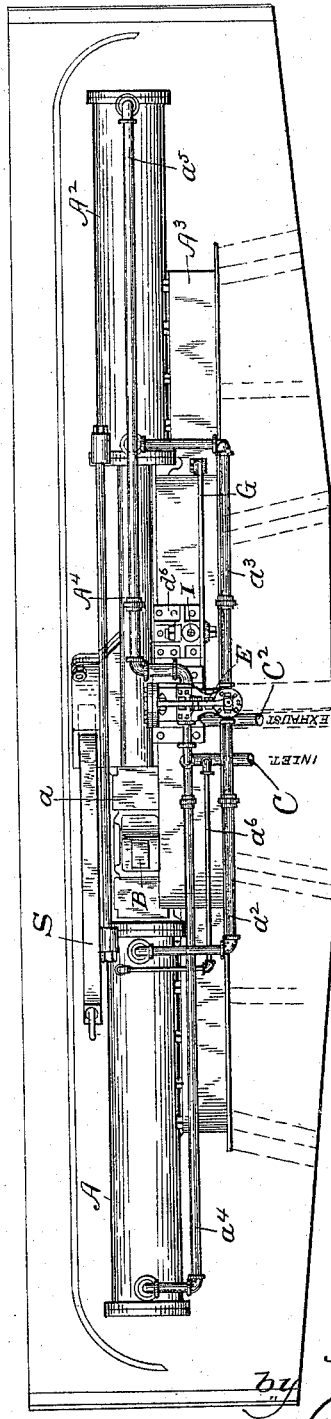

Figure 1 is a top plan view of the apparatus, showing the same positioned in the stern of the vessel. Fig. 2 is a view in front elevation. Fig. 3 is a view in side elevation. Fig. 4 is a vertical longitudinal section through the valve-chests. Fig. 5 is a horizontal sectional view through the valve-casing, taken on the line $xx$, Fig. 4. Fig. 6 is a vertical sectional view through the locking cushion-valve chest, taken on the line $yy$. Fig. 7 is a view in front elevation, displaying the arrangement of the drums and clutches by which the different steering-wheels may be brought into locked engagement with the screw-shaft which actuates the operating air-valve and displaying also in dotted lines the connection between the motor and the screw-shaft. Fig. 8 is a view in plan, displaying, on an enlarged scale, the screw-blocks and the screw-shaft by which the operating air-valve and locking cushion-valve are actuated and also a cut-out or switch to be used for the purpose of stopping the motor, when the same is employed, when the rudder is hard over. Fig. 9 is a transverse sectional view taken through one of the steering-wheel posts, showing the electrical connections leading from the motor and also the mechanical steering apparatus; and Fig. 10 is a view in front elevation, displaying the manner of connecting the steering-wheel with the mechanism for actuating the drums and also a reversing-coil by which the direction of motion of the motor may be changed when the rudder is moved hard over.

Referring to the drawings, A A$^2$ designate two cylinders which are arranged in this instance in horizontal alinement and are secured upon a suitable foundation or sole-plate A$^3$. Working within each cylinder is a piston (not shown) connected to a common piston-rod A$^4$, to which is secured a cross-head $a$, adapted to impart motion to a tiller B, that rotates the rudder-head $b$. The pistons are moved by compressed air, which is admitted and exhausted by pipes C C$^2$, respectively, the former being connected with a suitable supply of air under pressure, and when the apparatus is at rest the outer ends of the cylinder are under pressure and hold the piston, and with it the rudder, fixed, movement of the pistons resulting when air is partially exhausted from one cylinder and the supply maintained in the other, this result being effected by a peculiar arrangement of valves, to be described farther on.

In order to hold the rudder steady against the varying strains of heavy waves, the inner ends of the cylinders are filled with a fluid, preferably with compressed air, the flow of which through the pipes $a^2$ $a^3$ from the inner end of one cylinder to the inner end of the other cylinder takes place simultaneously with the change of supply of air from the outer end of one cylinder to the outer end of the other cylinder.

In order to effect the simultaneous action of the air, I provide two valve-chests D $D^2$, wherein are two valves separated from and operating independently of each other, one, the operating air-valve $d$, controlling the exhaust and supply of air to the outer ends of the cylinders, and the other one, the locking cushion-valve $d^2$, controlling the passage of air from the inner end of one cylinder to the inner end of the other cylinder.

The valve $d$ may be of any preferred type, and in this instance is shown as an ordinary slide-valve, sliding over the ports $d^3$ $d^4$ $d^5$, controlling the supply of air to the port cylinder, the exhaust from the cylinders, and the supply of air to the starboard cylinder, respectively.

It will be noted by reference to Fig. 4, wherein the parts are shown as occupying the position they would hold when the rudder is in line with the keel of the vessel, that there is no lap to the valve over the ports leading to the two cylinders, but that there is a slight space which will allow air from the inlet-pipe C always to pass through the ports leading to the respective cylinders. This is done to afford at all times thorough and adequate cushioning of the outer ends of the pistons, so that when at rest or in line with the keel the rudder will be as effectually cushioned as when moving to port or to starboard.

The locking cushion-valve $d^2$ is an ordinary piston working in a casing $d^6$, the latter being provided on each side with a threaded extension into which the pipes $a^2$ and $a^3$ are screwed, the said pipes being tapped into the cylinders near their inner ends, as clearly shown in Figs. 1 and 2. The casing $d^6$ is provided with a series of inward-projecting flanges $d^7$, on which the valve $d^3$ works, these flanges constituting ports through which, when the valve $d^2$ is moved to one side, the air escapes from the inner end of one cylinder to the inner end of the other, the passage being closed when the parts are in the position shown in Fig. 4, air being supplied to the outer ends of the cylinders through pipes $a^4$ and $a^5$.

In order to supply a constant flow of air to the inner end of the cylinders, so as to compensate for loss, as from leakage, a cushion air-pipe $a^6$ is provided, one end of which is tapped into the inner end of one of the cylinders and the other end into the supply-pipe C. By this arrangement air is supplied to the inner ends of the cylinders at each operation of the apparatus, as will be obvious by reference to Fig. 2.

The valves $d$ $d^2$ are moved in unison through the medium of the two-part rock-lever E, to one member $e$ of which is coupled the stem $d^7$ of the operating air-valve $d$ and to the other member $e^2$ the stem $d^8$ of the locking cushion-valve $d^2$. This two-part lever may be operated in many ways, but in this instance I prefer to operate it by mounting the roller $e^3$, constituting the fulcrum of the lever, on a horizontally-disposed slide-rod F, the outer end of which is bifurcated for the purpose of permitting the two members of the rocking lever working between it. The rear end of the slide-rod F is squared, as shown at $f$, and works in a similar-shaped bearing formed at the rear end of the valve-casing, the function of this square portion being to prevent any rocking or lateral play of the parts.

The slide-rod is operated by a lever G, constituting one member of a follow-up system, whereof the other members comprise a lever $g$, a bell-crank lever $g^2$, and a lever $g^3$, connecting with the steering-head post or with the tiller, the object of this follow-up system being to cause the amount of movement of the helm to correspond with the amount of movement given the wheel by the helmsman to cause the motion of the rudder to be stopped at the proper instant. The lever G is connected with a screw-threaded block H, working in a suitable casing $h$, adjacent to the valve-chests, the block being reciprocated by means of a screw-shaft I, actuated either from the steering-wheel or by a motor, as may be desired, when necessary. When the block is moved by the rotation of the screw-shaft I, motion is imparted to the lever G to move it in or out, according as the screw-shaft is rotated, thus shifting the operating air-valve to allow ingress of air to one cylinder and exhaust from the other cylinder and also moving the locking cushion-valve to allow the air in the inner end of one cylinder to escape to the inner end of the other cylinder. As the tiller is moved by the cross-head it imparts motion to the follow-up system, and the latter closes the valves $d$ $d^2$ when the rudder reaches the predetermined point, and thereby locks the latter in place until the valves are again opened in the manner described.

In order to determine the amount of movement to be given to the rudder, the steering-wheel post J is provided with a dial $j$, over which traverses a pointer $j^2$, actuated by bevel-gears $j^3$ $j^4$, mounted, respectively, on the steering-wheel shaft $j^5$ and a short shaft $j^6$, arranged above the shaft $j^5$, as clearly shown in Fig. 9.

Within the wheel-post are two incandescent lamps $j^7 j^8$, which may, if desired, be green and red, to designate, respectively, the starboard and the port sides of the vessel and are connected by suitable wires with a reversing-coil K, located in this instance at the base of the wheel-post, a lever $k$ being provided to reverse the current when necessary, as will appear farther on. A vertical shaft L is also arranged in the post and is actuated by bevel-gears $j^3$ and $l$ upon movement of the steering-wheel. This shaft carries at its lower end a sprocket-wheel $l^2$, around which passes a sprocket-chain $l^3$ to and around another sprocket-wheel $m$ on a shaft M, which extends down through the lower deck and carries a second sprocket-wheel $m^2$, around which passes a sprocket-chain $m^3$ to and around a drum N, and from the latter extends a wire rope $o$, to and around the drum O. (Shown in Fig. 7.)

It is to be understood that there will be a like arrangement of sprocket-wheels, sprocket-chains, wire ropes, and drums for every wheel-post employed, so that an explanation of one will serve for all.

The drum O carries a sprocket-wheel $o^2$, around which passes a sprocket-chain $o^3$ to and around a sprocket-wheel $i$ on the screw-shaft I. Thus when the steering-wheel is turned motion is imparted to the screw-shaft I, thence to the lever G, thence to the valves $d$ $d^2$, thence to the rudder and the follow-up system, and back again to the valves to close the same. The operation is the same with all the steering-wheels and therefore needs no further description.

In order that motion from the drums O $O^2$ $O^3$ may be transmitted to the shaft I, a number of clutches $i^2$ are provided, which are adapted to be locked into clutch-faces $i^3$, carried by the sprocket-wheel $i$. In this instance it is to be assumed that the drum O is operated directly from the main steering-wheel located in the pilot-house and that all the clutches except the one for this drum are out of locked engagement with the clutch-faces of the sprocket-wheels $i$. Should an accident happen to this steering-wheel, a signal will be transmitted to a seaman or helmsman, who will be stationed in the stern of the boat, to unclutch the clutch $i^2$ and to throw one of the other clutches into locked engagement with the clutch-face on another of the sprocket-wheels $i$. In case of engagement, where the steering will have to be done from the turret, all of the clutches will be thrown out of engagement with the sprocket-wheels, and the helmsman will then operate the valves by means of a hand-wheel P on the shaft I. It is to be understood that when the steering is accomplished in this manner a suitable signaling device may be employed to notify the helmsman which way to steer. As this will be obvious, a more detailed description thereof is deemed unnecessary.

Where the steering is to be effected electrically, a motor Q is employed, the shaft of which is provided with a beveled gear $q$ in engagement with a similar gear $i^4$ on a shaft I. These gears are normally out of engagement with each other and may be thrown into operative engagement by means of a lever $q^2$, which operates to shift the gear $q$ into and out of engagement with the gear $i^4$. In order to stop the motor when the rudder is hard over, a cut-out R is employed, comprising a bed $r$, secured to the sole-plate or base of the apparatus, and a lever $r^2$, fulcrumed on the lever G and having one end slotted to engage a pin $h^2$ on the screw-block H and the other end provided with a transversely-arranged bar $r^3$, carrying insulated end pieces $r^4$. Upon this plate are pivoted two arms $r^5$, which are held in contact with conducting-pieces $r^6$ by means of springs $r^7$. The contact-pieces $r^6$ are secured to a plate $r^8$, attached to the under side of the plate R, and from the plate $r^8$ extends a wire $r^9$ to the reversing-coil K at the wheel-post, the arms $r^5$ being connected with the dynamo or other source of electricity by wires $r^{10}$ and $r^{11}$. When the parts are in the position shown in Fig. 8, the motor is free to run, but as soon as the screw-block H has moved a sufficient distance to bring one of the contact-points $r^4$ into engagement with one of the arms $r^5$ the circuit is broken and the motor stops. To restart the motor, it will only be necessary to shift the lever of the reversing-coil, when the current will pass through the wires $r^9$ and $r^{10}$ or $r^9$ and $r^{11}$, as the case may be, to reverse the direction of flow of current to the motor again to start it.

In order to guard against accident, a supplemental tiller S is employed, which may be brought into use in case any accident should happen to the mechanical part of the apparatus. This may be done by throwing a key $s$ out of engagement with the tiller proper, so that the steering-post may be turned without interference with the tiller B. A suitable brake T may also be used, in case of an emergency, to lock the rudder at the desired position.

Having thus described my invention, what I claim, and desire to secure by Letters Patent, is—

1. In steering-gear, aeriform-fluid-receiving cylinders, a piston-rod operated from the cylinders, and a rudder connected by interposed mechanism with the said rod, in combination with fluid-supply pipes connecting with the like ends of the cylinders, exhaust-pipes connecting with the other ends, and valves for controlling the passage of fluid through the pipes, substantially as described.

2. In steering-gear, aeriform-fluid-receiving cylinders, a piston-rod common to the cylinders, and a rudder connected by interposed mechanism with the said rod, in combination with fluid-supply pipes connecting with the like ends of the cylinders, exhaust-pipes connecting with the other ends, valves for controlling the passage of fluid through the pipes, and mechanism for operating the valves in unison, substantially as described.

3. A steering-gear comprising two cylinders, a piston-rod common to both cylinders, a cross-head on the said rod for actuating the tiller, and valves for controlling the simultaneous admission of air or other aeriform fluid to the cylinders and exhaust therefrom, and also for cushioning the piston, the supply and exhaust taking place at like ends of the cylinders, and the cushioning at the other ends, substantially as described.

4. A steering-gear comprising two cylinders, a piston-rod common to both cylinders, a cross-head on the said rod for actuating the tiller, and two valves operating in unison, one of which controls the supply of aeriform fluid to like ends of the cylinders and exhaust therefrom, and the other the passage of fluid from one cylinder to the other to afford a cushion for the piston, substantially as described.

5. A steering-gear comprising two cylinders, a piston-rod common to both cylinders, a cross-head on the said rod for actuating the tiller, two valves operating in unison, the one for controlling the supply of aeriform fluid to like ends of the cylinders and exhaust therefrom, and the other the passage of fluid from one cylinder to the other to afford a cushion for the piston, and a cushion fluid-pipe for supplying a constant feed of fluid to the cylinders to compensate for leakage, substantially as described.

6. A steering-gear comprising two cylinders, a piston-rod common to both cylinders, a cross-head on the piston-rod for actuating the tiller, two valves, one of which controls the supply of aeriform fluid to the cylinders and the exhaust therefrom, and the other the passage of the fluid from one cylinder to the other to afford a cushion to the pistons, and a rock-lever for actuating the valves, substantially as described.

7. A steering-gear comprising two cylinders, a piston-rod common to both cylinders, a cross-head on the piston-rod for actuating the tiller, two valves, one of which controls the supply of aeriform fluid to the cylinders and the exhaust therefrom, and the other the passage of the fluid from one cylinder to the other to afford a cushion to the pistons, and a two-part rock-lever for actuating the valves, substantially as described.

8. A steering-gear comprising two cylinders, a piston-rod common to both cylinders, a cross-head on the said rod for actuating the tiller, two valves, one of which controls the passage of aeriform fluid to the cylinders and the exhaust therefrom, and the other the passage of fluid from one cylinder to the other to afford a cushion to the pistons, a two-part rock-lever for actuating the valves, and a follow-up system actuated from the tiller and connected by interposed mechanism with the rock-lever, whereby the amount of movement of the helm is made to correspond with the amount of movement given the wheel by the helmsman, substantially as described.

9. A steering-gear comprising two cylinders, a piston-rod common to both cylinders, a cross-head on the said rod for actuating the tiller, two valves, one of which controls the passage of aeriform fluid to the cylinder and the exhaust therefrom, and the other the passage of fluid from one cylinder to the other to afford a cushion to the piston, a two-part rock-lever for actuating the valves, a follow-up system, connected at one end to the tiller and, at the other end by interposed mechanism with the rock-lever, a movable block connected to one member of the system, and a shaft actuated by suitable mechanism to reciprocate the block and thereby shift the valves, substantially as described.

10. In steering-gear, aeriform-fluid-receiving cylinders, a piston-rod operated from the cylinders, and a rudder connected by interposed mechanism with the said rod, in combination with fluid-supply pipes connecting with like ends of the cylinders, exhaust-pipes connecting with the other ends, valves for controlling the passage of fluid through the pipes, and mechanism adapted to be operated from different points on the vessel to work the valves, substantially as described.

11. In steering-gear, aeriform-fluid-receiving cylinders, a piston-rod operated from the cylinders, and a rudder connected by interposed mechanism with the said rod, in combination with fluid-supply pipes connecting with like ends of the cylinders, exhaust-pipes connecting with the other ends, valves for controlling the passage of fluid through the pipes, and mechanism adapted to be operated from different points on the vessel to work the valves, comprising a lever connecting at one end with the valve-operating mechanism, and at its opposite end through interposed mechanism with the rudder, a block secured to the lever, a shaft adapted upon rotation to reciprocate the block, and independently-operating mechanism leading from the different steering-stations on the vessel and connecting with the shaft, substantially as described.

12. In steering-gear, aeriform-fluid-receiving cylinders, a piston-rod operated from the cylinders, and a rudder connected by interposed mechanism with the said rod, in combination with fluid-supply pipes connecting with like ends of the cylinders, exhaust-pipes connecting with the other ends, valves for controlling the passage of fluid through the pipes, mechanism adapted to be operated from different points on the vessel to work the valves, comprising a lever connecting at one end with the valve-operating mechanism, and at its opposite end through interposed mechanism with the rudder, a block secured to the lever, a shaft adapted upon rotation to reciprocate the block, independently-operating mechanism leading from the different steering-stations on the vessel and connecting with the shaft, and clutch mechanism on the shaft to cut into or out of operative connection therewith any of the steering-stations, substantially as described.

13. In steering-gear, aeriform-fluid-receiving cylinders, a piston-rod operated from the cylinders, and a rudder connected by interposed mechanism with the said rod, in combination with fluid-supply pipes connecting with like ends of the cylinders, exhaust-pipes connecting with the other ends, valves for controlling the passage of fluid through the pipes, mechanism adapted to work the valves, comprising a lever connecting at one end with the valve-operating mechanism, and at its opposite end through interposed mechanism with the rudder, a block secured to the lever, a shaft adapted upon rotation to reciprocate the block, an electric motor normally out of engagement with the shaft, but adapted to be brought into engagement therewith, a cut-out device in electrical connection with the motor, the source of electrical energy and with reversing-coils located at the different steering-stations, and a shifting lever actuated by the block to operate the cut-out to cause it to break the circuit to the motor and thereby stop the rotation of the shaft when the rudder has reached a predetermined point, and, upon reversal of the current, again to start the motor, substantially as described.

14. In steering-gear, aeriform-fluid-receiving cylinders, a piston-rod operated from the cylinders, and a rudder connected by interposed mechanism with the said rod, in combination with fluid-supply pipes connecting with like ends of the cylinders, exhaust-pipes connecting with the other ends, valves for controlling the passage of fluid through the pipes, mechanism adapted to be operated from different points on the vessel to work the valves, comprising a lever connecting at one end with the valve-operating mechanism, and at its opposite end through interposed mechanism with the rudder, a block secured to the lever, a shaft adapted upon rotation to reciprocate the block, independently-operating mechanism leading from the different steering-stations on the vessel and connecting with the shaft, clutch mechanism on the shaft to cut into or out of operative connection therewith any of the steering-stations, and a hand-wheel on the shaft to operate the same independently of the mechanism from the steering-stations, substantially as described.

In testimony whereof I affix my signature in presence of two witnesses.

HARRY A. SPILLER.

Witnesses:
   DAVID H. MEAD,
   F. B. KEEFER.